United States Patent

[11] 3,585,318

[72] Inventor Siegfried H. Fuchs
Chicago, Ill.
[21] Appl. No. 845,009
[22] Filed July 25, 1969
[45] Patented June 15, 1971
[73] Assignee GTE Automatic Laboratories Incorporated
Northlake, Ill.

[54] MATRIX CARD TEST CIRCUIT
9 Claims, 1 Drawing Fig.

[52] U.S. Cl. .......... 179/175.2C,
179/18 AB, 179/175.2 R
[51] Int. Cl. .......... H04m 3/22
[50] Field of Search .......... 179/175.2
C, 175.2 R, 175, 18 AB

[56] References Cited
UNITED STATES PATENTS
3,247,325 4/1966 Han et al. .......... 179/175.2

*Primary Examiner*—William C. Cooper
*Assistant Examiner*—Douglas W. Olms
*Attorneys*—Cyril A. Krenzer, K. Mullerheim, B. E. Franz and Robert J. Black

ABSTRACT: A circuit arrangement to be connected to a telephone system card mounted cross-point matrix for the purpose of determining if the cross-points in the matrix are in use, prior to removing the card for servicing. The included circuitry gives indications of the status of the cross-points being tested and prevents idle cross-points or cross-points that go from a busy to idle condition from being seized for further usage in the telephone system.

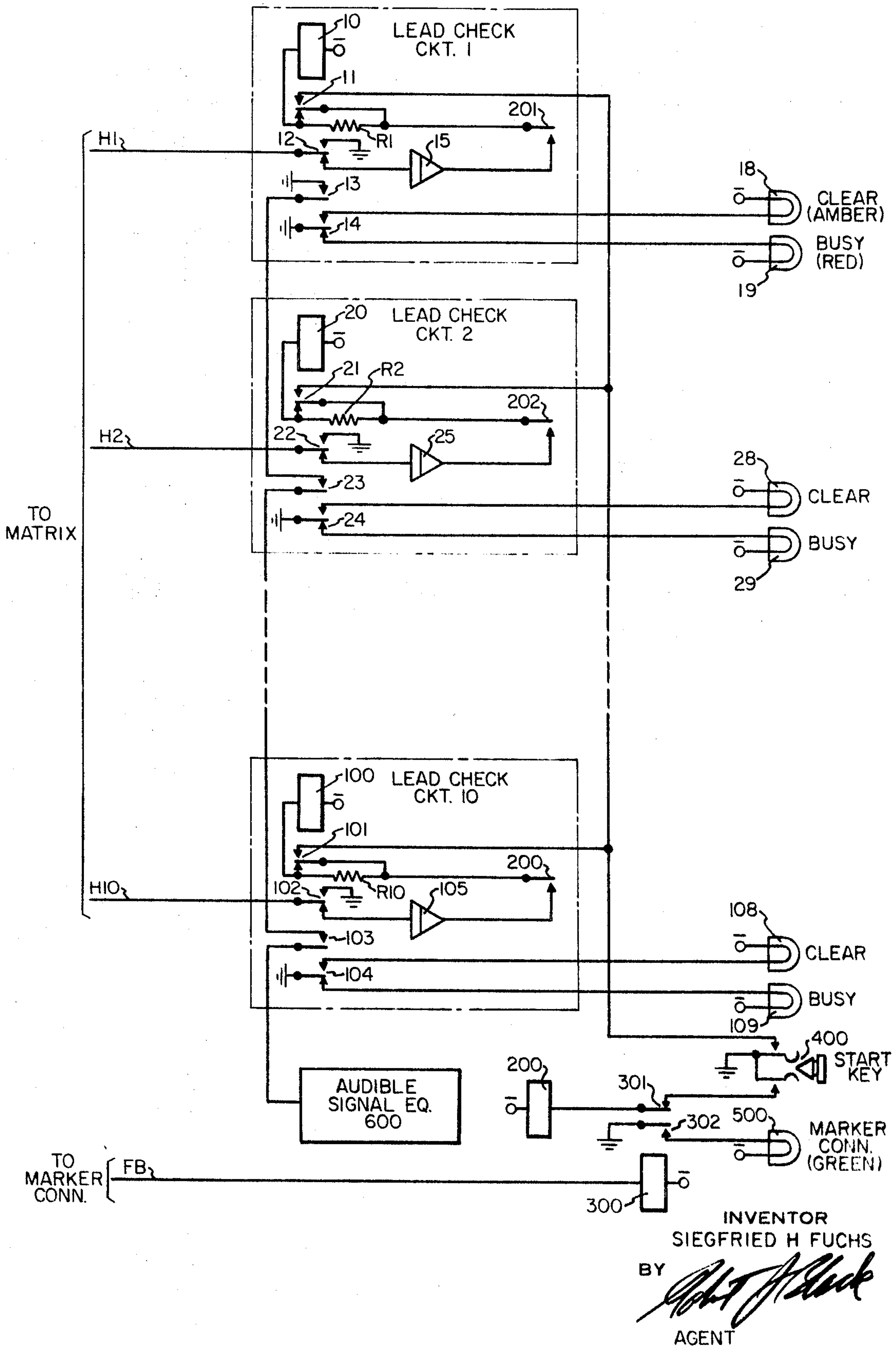
INVENTOR
SIEGFRIED H FUCHS
BY
AGENT

MATRIX CARD TEST CIRCUIT

MATRIX CARD TEST CIRCUIT

BACKGROUND OF THE INVENTION

1. Field of the Invention

This invention relates to a monitoring of cross-points mounted on a "printed circuit" card and employed in a communication or similar electrical system.

2. Description of the Prior Art

At the present time it has become common in recently developed electronic telephone switching systems to mount most of the included electronic components on printed circuit cards. These cards in turn are usually mounted on a plug-in basis in banks or frames on vertical racks. Maximum density of packaging is achieved in this manner, while preserving access to the individual cards for maintenance purposes.

Many esoteric techniques have been developed for locating faulty circuits in electronic systems, and accordingly it is frequently relatively simple to determine the location of a faulty circuit for servicing purposes. However, it is also quite common to mount several or even many circuits of the same kind on a common printed circuit board. To correct the faulty circuit it becomes necessary then to remove from its supporting frame and connections, the printed circuit card containing the faulty circuit. The principal drawback existing under these conditions is; the other included circuits which are not malfunctioning may or may not be in use at that particular time.

In the case of communications systems and particularly telephone systems, the removal of a single printed circuit card might break several established telephone conversations, with the resultant complaints.

Alternately, a maintenance man, to prevent a breaking of the established telephone conversation paths, might individually test leads associated with the conversation path in any given printed circuit card and then ground the used path to render it busy to further access. Of necessity, encountering a busy circuit path would require that the maintenance man test again each circuit path until such time as all circuits were determined as being idle on a particular card, grounding each idle circuit as it becomes idle. Obviously this could be an extremely time consuming process as many conversation paths may be held for extremely long periods of time. No automatic means of accomplishing this end are known.

SUMMARY OF THE INVENTION

The present invention is a portable test unit that may be readily connected to a printed circuit card that mounts a plurality of circuits over which conversation paths may occur, giving a visual indication of all idle circuits, and conditioning such circuits so they will not be used for further conversational paths. As additional circuits go from a busy to idle condition, the test unit will busy the circuits out to prevent further access or usage by the communication system. When all the circuits on a card to which the test unit is connected are idle and have been rendered inaccessible to the communication system, then an audible signal is given to signal a maintenance man that the card may now be removed for servicing. Obviously, it is not necessary for the maintenance man to be in constant attendance at the test unit, since all operations are automatic once the test unit has been connected to the desired circuit card and its operation initiated.

BRIEF DESCRIPTION OF THE DRAWING

The accompanying drawing is a schematic circuit diagram of a matrix card test circuit in accordance with the present invention.

DESCRIPTION OF THE PREFERRED EMBODIMENT

Referring to the accompanying drawing the matrix card test circuit consists of a plurality of lead check circuits. One lead check circuit being provided for each lead extending to a matrix cross-point. In the embodiment shown it is anticipated that a matrix having 10 cross-points would be located on a single card to be tested. Accordingly, the accompanying drawing shows the first, second and last lead check circuits (lead check circuits 1, 2, and 10) of a group of 10 circuits. Intermediate lead check circuits 3 through 9 are not shown. Each of these however would be identical to lead check circuit 2.

Each lead check circuit includes a relay such as relay 10, 20, etc., each having associated contacts and a relay driver such as 15, 25, etc. The relay driver may be of conventional design, constructed to provide an operating ground at its output in response to the presence of battery at its input. Relay drivers such as this are well known and the particular circuit details and construction of the driver employed in the present invention do not constitute in any way a portion of the present invention. Also included in each lead check circuit is a pair of contacts such as 201, 202, etc., operated from relay 200, which is common to the entire matrix card test circuit.

Associated with each lead check circuit are two lamps or similar visual indicators such as 18 and 19, 28 and 29, etc. The "Clear" lamps such as 18 indicate that a particular matrix cross-point is in an idle condition and has been further conditioned to prevent seizure from other circuitry. The other lamp associated with each lead check circuit is a "Busy" lamp such as 19, which indicates when a particular cross-point involved in the matrix and associated with the lead check circuit is busy or in operation.

In at least one embodiment based upon the present invention the use of an amber colored lamp to indicate the "Clear" condition has been employed while a red lamp has been utilized to indicate a "Busy" condition.

Common to the matrix card test circuitry in accordance with the present invention are a start key 400, a "marker connected" relay 300, and a marker connected lamp 500. In at least one embodiment the marker connected lamp has been green, to differentiate it over the "Idle" (amber) and "Busy" (red) lamps associated with the lead check circuits referred to above. Also included is audible signaling equipment 600. This device may take any convenient form such as bell, buzzer, etc. that may be activated upon extension of a ground from the lead check circuits.

In typical usage the leads H1, H2 through H10 extending each to an associated lead check circuit, would be terminated in some form of connector which could be readily attached to a printed circuit card, without removing the printed circuit card from its associated frame. Of necessity the printed circuit cards employed would contain terminals to receive such a connector, with the terminals being connected to the matrix cross-points. A single connector extending a marker connect point might also be included in the same connector or might be a separate lead extending to a different location on the frame under test. The lead check circuits and the common circuitry that comprise the present invention would all conveniently be mounted in a portable unit including the audible and visual signal equipment referred to above as well as the aforementioned start key. Connection to the frame to be tested or to the particular card to be tested would also provide the necessary battery and ground connections for powering the test unit. The detailed battery and ground connections have not been shown, however, it should be apparent that any such connection would be of a clearly conventional nature.

Turning now to the operation of the matrix card test circuitry in accordance with the present invention, a maintenance man desiring to make a test of a particular printed circuit card containing, for example, a matrix having 10 cross-points would place the portable test unit including test circuitry in accordance with the present invention in some location convenient to the card that is to be tested. This testing might be as a result of suspected difficulties, or as a portion of a routine testing schedule. The maintenance operator would then connect leads H1 through H10 and lead FB as well as battery and ground leads from the test unit to the card and/or frame to be tested based on the appearance of appropriate test terminals at those points.

The establishment of a proper connection will be indicated to the maintenance man, by lamps 19, 29 (39 through 99 not shown) and 109 all lighting. At this point knowing that the connections have been established, the maintenance man will operate locking start key 400. This key at its upper spring contacts will extend ground to each of the lead check circuits 1 through 10 inclusive to prepare a holding circuit for relays 10 through 100. At its lower contacts ground will be extended through contact 301 of relay 300 to relay 200 causing relay 200 to operate.

Referring now to lead check circuit 1, with operation of relay 200 a path will be extended from relay driver 15 at operated contacts 201, through break spring 11 to relay 10. If ground is present on lead H1 relay driver 15 will not operate and the ground at break contact 14 will maintain the busy lamp 19 operated. This is based on the conventional operation where presence of ground on the H lead indicates a busy condition of the associated matrix cross-point. Lead check circuits 2 through 10 obviously will operate in a similar manner.

If an absence of ground is detected through break contact 12 by relay driver 15 on lead H1, the driver circuitry will operate and extend ground through previously operated contact 201 and the bypass circuit around resistance R1 that extends through the break contacts 11 to the coil of relay 10, causing relay 10 to operate. Operation of relay 10 is effective at make contact 11 to establish a locking path for relay 10 that extends from the relay through resistance R1 and make contact 11 to the upper spring of previously operated locking start key 400. As long as this key is retained in the operated position this ground is present and available for the individual relays associated with each of the lead check circuits to lock to. At make contacts 12 which are now operated a ground will be extended over lead H1 to the matrix cross-point to render it busy. At contacts 13 a path from ground will be prepared to a chain circuit that goes through all lead check circuits in the test unit. This circuit when completed will establish an operating path for audible signaling equipment 600. At break contacts 14 ground will be removed from "Busy" lamp 19 causing it to become extinguished, and in turn applied at make contacts 14 to the "Clear" lamp 18 to indicate the condition of the cross-point associated with lead check circuit 1. As noted previously lead check circuits 2 through 10 operate in similar manner.

Assuming now that leads H1 and H2 both indicated an absence of ground and the associated clear lamps 18 and 28 are operated and that lead check circuits 3 through 9 which are not shown are also in similar condition, and further assuming that ground is present on lead H10 extending to lead check circuit 10 the following will describe the further operation of the present test circuitry.

In the conditions as described "Clear" lamps 18, 28 and 38 through 98 (not shown) will be operated as will "Busy" lamp 109. Assuming now that the matrix cross-point associated with lead H10 which has been busy, becomes idle, ground is removed from lead H10 which extends through break contact 102 to relay driver 105. At this time with removal of ground from lead H10, relay driver 105 will operate to extend ground through previously operated contact 210 and break contact 101 to relay 100 causing it to operate. Ground will be returned over the H10 lead at contact 102, relay 100 will lock to the operating path extending back to start key 100, at contacts 101, "Clear" lamp 108 will operate from ground extended at make contact 104 and the chain circuit to the audible signal equipment 600 will be completed over a path extending from ground through contacts 13, 23 (33 to 93, not shown) and 103 to the audible signal equipment 600 causing it to operate.

Activation of the audible signal equipment 600 will act as a signal to the maintenance man that all of the matrix cross-points in the card under test, are now in the idle condition, and that the card may be safely removed without interruption of service. Removal of the card under test, and subsequent replacement with a card of known integrity, would then permit removal of the test unit.

If however as associated marker is accessing the matrix under test, relay 300 would be actuated over lead FB. Operation of relay 300 would, at contacts 302 cause "Marker Connected" lamp 500 to operate as a signal to the maintenance man and at break contacts 301 break the operating path for relay 200. With relay 200 unable to operate the individual operating paths at contacts 201, 202, etc. through 210 cannot be completed to associated relays 10, 20, etc. of the lead check circuits 1, 2, etc. The maintenance man could then leave the portable test unit in place. At such time as the marker is no longer requesting service, relay 300 would restore removing ground at contacts 302 from the "Marker Connected" lamp 500 and restore the operating path for relay 200 at contacts 301. At such time operation of the individual lead check circuits becomes possible and normal operation of the test unit would resume.

While the present test circuitry has been shown in a particular environment, it should be obvious that the present invention could be practiced in many electronic applications where a plurality of similar circuits are mounted on or in a common device, where it is desirable to determine the condition (operated or nonoperated) of the circuitry. Any such application would be entirely within the scope of the present invention and therefore within the scope of the appended claims.

What I claim is:

1. A testing circuit connected to a plurality of communication circuits, operated to detect idle and busy conditions of said communication circuits prior to removal of said communication circuits from service for maintenance, said testing circuit comprising: a plurality of lead check circuits, each connected to a different one of said communication circuits; starting means operated to condition each of said lead check circuits; each of said conditioned lead check circuits operated in response to detection of an idle condition of said connected communication circuit to render said communication circuit busy; and audible signal means connected to each of said lead check circuits; said audible signal means operated in response to operation of all of said connected lead check circuits rendering all of said connected communication circuits busy.

2. A testing circuit as claimed in claim 1 wherein: each of said lead check circuits include relay means conditioned in response to said starting means; and relay driver means connected to said communication circuit operated in response to detection of absence of ground on said connection to said communication circuit, to operate said relay means.

3. A testing circuit as claimed in claim 1 wherein: said starting means comprise a locking key switch.

4. A testing circuit as claimed in claim 1 wherein: there are further included a plurality of visual indicators including at least one different visual indicator connected to each of said lead check circuits; said operated lead check circuit further effective to operate said connected visual indicator.

5. A testing circuit as claimed in claim 1 wherein: each of said lead check circuits includes circuit connections to a first visual indicator and circuit connections to a second visual indicator, said first visual indicator operated in response to said conditioned lead check circuit detecting a busy condition on said connected communication circuit.

6. A testing circuit as claimed in claim 5 wherein: said conditioned lead check circuit in response to detecting an idle condition on a connected communication circuit previously detected as busy, is further operated to extinguish said first connected visual indicator and operate said second connected visual indicator and render said connected communication circuit busy.

7. A testing circuit as claimed in claim 1 wherein: said communication circuits are each accessible by a marker circuit, and said testing circuit further including: inhibit means connected to said marker circuit, said inhibit means operated in response to said marker circuit accessing said communication circuits, to disable said lead check circuits.

8. A testing circuit as claimed in claim 7 wherein: said circuit inhibit means include a visual indicator, operated to indicate the disabling of said lead check circuits.

9. A testing circuit as claimed in claim 7 wherein: said inhibit means comprise relay means connected to said access means operated in response to said access means to render said lead check circuits inoperative; and a visual indicator operated in response to said relay means to indicate the disabling of said lead check circuits.